US006922178B2

(12) United States Patent
Sutter et al.

(10) Patent No.: US 6,922,178 B2
(45) Date of Patent: Jul. 26, 2005

(54) MULTIPLE PITCH ANTENNA ASSEMBLY

(75) Inventors: Robert William Sutter, Wheeling, IL (US); William B. Weaver, Knoxville, TN (US); Weiping Dou, Elkridge, MD (US)

(73) Assignee: Amphenol-T&M Antennas, Vernon Hills, IL (US)

(*) Notice: Subject to any disclaimer, the term of this patent is extended or adjusted under 35 U.S.C. 154(b) by 13 days.

(21) Appl. No.: 10/603,588

(22) Filed: Jun. 25, 2003

(65) Prior Publication Data

US 2004/0263413 A1 Dec. 30, 2004

(51) Int. Cl.[7] .................................................. G01Q 1/36
(52) U.S. Cl. ....................................................... 343/895
(58) Field of Search ................................ 343/895, 893, 343/788

(56) References Cited

U.S. PATENT DOCUMENTS

| | | | | | |
|---|---|---|---|---|---|
| 3,617,890 | A | * | 11/1971 | Kurauchi et al. | 455/41.1 |
| 6,369,775 | B1 | * | 4/2002 | Moore et al. | 343/893 |
| 2002/0014996 | A1 | * | 2/2002 | Keiten | 343/702 |
| 2004/0119657 | A1 | * | 6/2004 | Mayer et al. | 343/906 |

* cited by examiner

*Primary Examiner*—Don Wong
*Assistant Examiner*—Huedung X. Cao
(74) *Attorney, Agent, or Firm*—Greer, Burns & Crain, Ltd

(57) ABSTRACT

A multiple bandwidth antenna assembly including a helical radiator having at least a first helical pitch and a second helical pitch, a core plug having a first axial piece and a second axial piece, and a first recessed pattern configured on the first axial piece to engage at least the first helical pitch and a second recessed pattern configured on the second axial piece to engage at least the second helical pitch.

24 Claims, 5 Drawing Sheets

MULTIPLE PITCH ANTENNA ASSEMBLY

FIELD OF THE INVENTION

The field of the invention is antennas for portable communication devices.

BACKGROUND OF THE INVENTION

Worldwide availability of wireless services has created a demand for wireless network phones that are operable worldwide. In different regions of the world, there are different frequency allocations. A phone that is operable in each of the different regions requires either multiple antennas or multiple bandwidth antennas that cover the different frequency allocations. Multiple bandwidth antennas are a better option because wireless network portable phones benefit from compact antennas. Additionally, a multiple bandwidth antenna requires fewer parts, which is both more efficient and cost effective.

Performance of compact single bandwidth and multiple bandwidth antennas is dependent upon repeatable manufacturing. A preferred component in multiple bandwidth antennas is a helical radiator, which offers compact physical length. Mechanical tolerances for the manufacture of helical radiators have become more exacting as the electrical performance demands of a helical radiator have changed to permit multiple bandwidth antenna designs. Maintaining proper dimensions on a helix, e.g., the pitch, diameter, and length, is difficult using conventional spring making machines. This is especially true in a multiple pitch helix antenna. Moreover, maintaining proper dimensions on a multiple pitch helix during manufacture of the assembled antenna is difficult using conventional assembly. It is also important to have an antenna assembly that is simple to manufacture, as this reduces manufacturing costs. Thus, there is a need for an improved antenna assembly including a multiple pitch helical radiator that achieves dimensional stability during the manufacturing process.

SUMMARY OF THE INVENTION

A multiple bandwidth antenna assembly of the instant invention includes a helical radiator having multiple pitch distances wherein the helical radiator is assembled around a nonconductive core plug. A preferred multiple bandwidth antenna assembly includes a helical radiator having at least a first and a second helical pitch. The nonconductive core plug has at least two pieces that are each configured to nest within the helical radiator. A first piece includes at least a first recessed pattern on an outside surface that is configured to engage the first helical pitch of the helical radiator, and a second piece includes at least a second recessed pattern on an outside surface that is configured to engage the second helical pitch of the helical radiator. Assembly preferably includes pre-forming a multiple pitch helical radiator, and subsequently assembling the pre-formed multiple pitch helical radiator around the respective core pieces. Preferably, when assembled, end portions of the first and second pieces matingly engage one another to form a single nonconductive core plug.

DETAILED DESCRIPITION OF THE INVENTION

Figure 1:
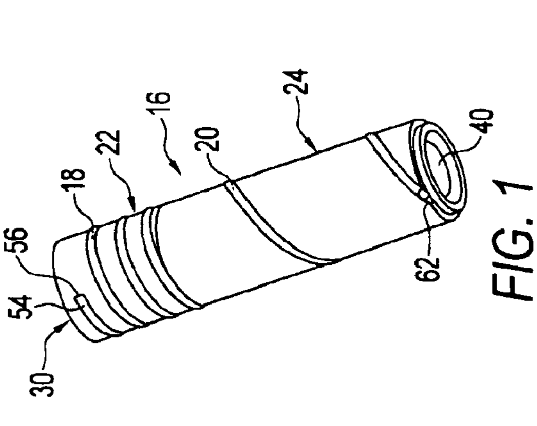
FIG. 1 is a side elevational view of the multiple pitch antenna assembly of the instant invention.
Figure 2:
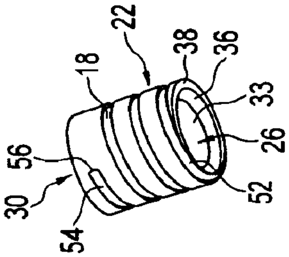
FIG. 2 is a side elevational view of the first piece of the nonconductive core piece of the instant invention.
Figure 3:
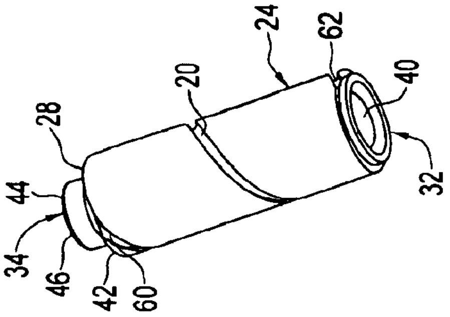
FIG. 3 is a side elevational view of the second piece of the nonconductive core piece of the instant invention.
Figure 4:
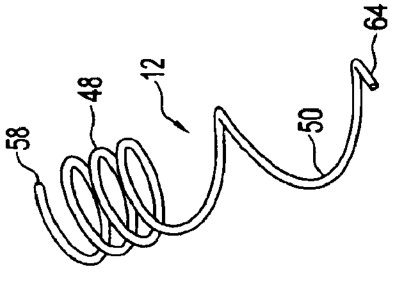
FIG. 4 is a side elevational view of a multiple pitch helical radiator used with the nonconductive core piece of the instant invention.
Figure 5:
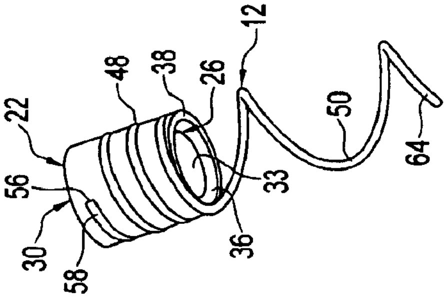
FIG. 5 is a side elevational view of the first piece of the nonconductive core piece of the instant invention coupled to a multiple pitch helical radiator.
Figure 6:
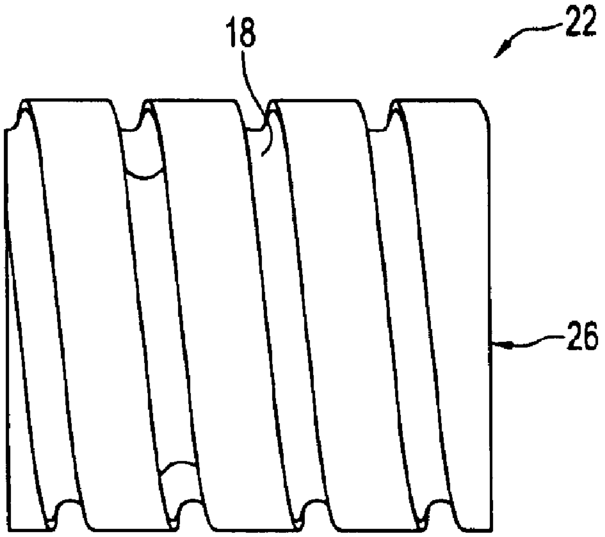
FIG. 6 is a side elevational view of the first piece of the nonconductive core plug of the instant invention.
Figure 7:
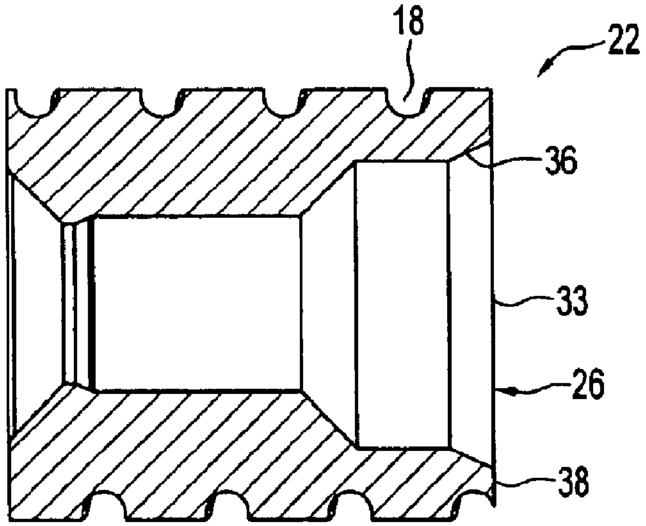
FIG. 7 is a cross sectional view of the first piece of the nonconductive core plug of the instant invention.
Figure 8:
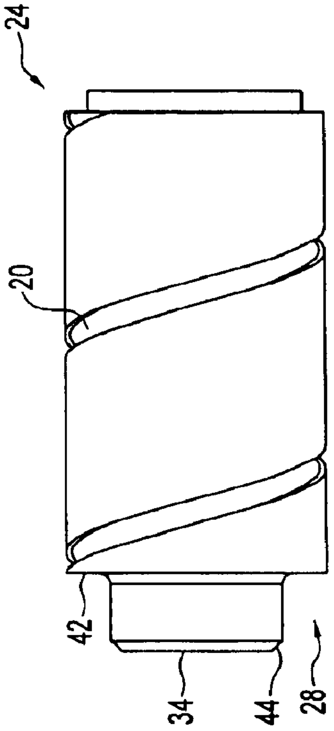
FIG. 8 is a side elevational view of the second piece of the nonconductive core plug of the instant invention.
Figure 9:
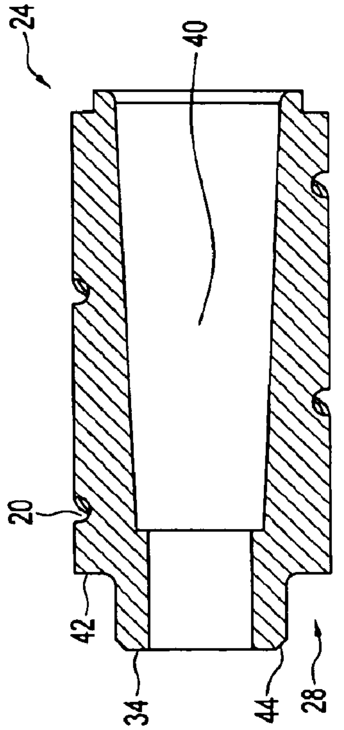
FIG. 9 is a cross sectional view of the second piece of the nonconductive core plug of the instant invention.

The instant invention is directed to a multiple bandwidth antenna assembly that includes a multiple pitch helical radiator and a core plug having a plurality of pieces, each of which is configured to engage a corresponding predetermined section of the multiple pitch helical radiator. Thus, each core plug piece may be separately assembled within a corresponding portion of the multiple pitch helical radiator without encountering materially non-corresponding helical portions, which tend to deform the pitch distance of the non-corresponding multiple pitch helical radiator.

Alternatively, each of the plurality of pieces of the core plug may be configured to engage the helical radiator wherein the pitches of a single core plug piece are configured to be similar enough to one another that distortion of the non-corresponding pitch on the helical radiator is minimized. Helical radiators are relatively rigid, and maintaining a precise helical pitch is important to the proper function of the antenna. However, helical radiators are typically resilient enough to withstand a minimal amount of deformation while maintaining the predetermined helical pitch. For example, a helical radiator may withstand a deformation of between 2 and 3 mm while conforming the predetermined helical pitch. Thus, insofar as a single piece of a core plug may include, for example, two pitch distances that are relatively similar to one another, the antenna assembly of the instant invention contemplates a total of three or more total helical pitches in an assembled core plug, around which is assembled a helical radiator having a predetermined pitch that conforms to the helical pitches of the assembled core plug.

Thus, because the core plug is severable into a plurality of separate pieces, the multiple pitch helical radiator may advantageously be pre-formed to have a general predetermined pitch or plurality of pitches, into which the respective core plug pieces are then assembled. Moreover, while the instant invention will be shown and described with exemplary antenna applications and exemplary helical pitches, the instant invention is not limited to these exemplary applications, used only to illustrate the instant invention. For example, as those skilled in the art will appreciate, the instant multiple pitch antenna assembly may form an upper portion of a top loaded retractable antenna, a bottom portion of a bottom loaded retractable antenna, a stubby antenna, and even included within an internal antenna. By way of example only, the instant multiple pitch antenna assembly will be illustrated with a bottom loaded whip antenna.

Owing to its unique configuration, the antenna assembly of the present invention is amenable to a reliable and convenient method of assembly as well, wherein a multiple pitch helical radiator may be assembled onto a nonconductive core piece without materially deforming or altering the pitches of the radiator. Traditionally, single core pieces have been used to confer stability to single pitch helical radiators so that they may subsequently be overmolded in a reliable and repeatable fashion without deforming the radiator in the process. However, multiple pitch helical radiators are not amenable to assembly with a single core piece because as conventional core plugs are inserted into conventional helical radiators, the recess pattern configured on a leading end of the core plug frictionally engages a non-mating helical pitch of the helical radiator, thereby causing significant deformation of that portion of the helical radiator. The resistance encountered by the helical radiator as it is screwed onto a conventional core plug materially deforms the helical radiator. Maintaining proper dimensions on a helix, e.g., the pitch, diameter, and length, is important so as to preserve the precise and accurate multiple bandwidth RF performance of the multi-pitch antenna. Thus, conventional methods for manufacturing multiple pitch antennas have omitted core pieces altogether. Because the instant multiple pitch antenna assembly includes a nonconductive core plug that includes a plurality of pieces, the nonconductive core plug may be inserted into a pre-formed multiple pitch helical radiator in a plurality of pieces, thereby reducing or eliminating deformation of the helical radiator as it is assembled to the core piece.

The present invention is related to a multiple bandwidth antenna assembly, designated generally at 10, which includes a multiple pitch helical radiator 12 that is assembled around a nonconductive core plug 16. A preferred multiple bandwidth antenna assembly 10 includes the multiple pitch helical radiator 12 having a predetermined pitch. The nonconductive core plug 16 preferably includes at least a first recessed pattern 18 and a second recessed pattern 20, one of which is configured on each of two axial pieces that are configured to be removably securable to one another or to have end portions that abut one another. The core plug 16 is designed so that the first and second recessed patterns 18, 20 may be assembled within the helical radiator 12 without materially deforming or altering the predetermined pitch of the helical radiator. Thus, pre-forming of the multiple pitch helical radiator 12 so that it may be assembled to the core plug 16 having a predetermined number of pitches is possible.

The preferred nonconductive core plug 16 is a generally hollow, cylindrical structure preferably made of plastic, and includes a plurality of axial pieces that may be removably secured to one another. While the preferred core plug 16 is hollow, the instant invention contemplates applications wherein the core plug is not hollow but is instead solid. While the instant invention contemplates use of multiple axial pieces, the preferred embodiment includes a first piece 22 and a second piece 24.

Preferably, each of the first and second pieces 22, 24 is generally hollow and cylindrical, and is preferably composed of a plastic such as a TPU or polycarbonate. For example, in one embodiment, the first piece 22 may be composed of a TPU such as Texin 255, which is a relatively more elastic material, while the second piece 24 may be composed of a polycarbonate such Lexan 141, which is a relatively less elastic material. Alternatively, both the first and second pieces 22, 24 may be composed of a TPU, such as Texin or Estane.

Each piece 22, 24 includes a predetermined external circumference that is configured to nest within the multiple pitch helical radiator 12. The predetermined external circumference of the first piece 22 is further preferably configured to be generally the same as that of the second piece 24 so that when assembled to one another, the first and second pieces generally exhibit a single predetermined external circumference. However, the instant antenna assembly 10 contemplates applications wherein the core plug 16 includes first and second pieces 22, 24 having differing external circumferences, such as where the first piece has a larger external circumference than that of the second piece.

In the preferred embodiment, the first and second pieces 22, 24 are configured so that, when assembled, a generally cylindrical, nonconductive core plug 16 having separable pieces is obtained. The first piece 22 and the second piece 24 of the nonconductive core plug 16 each include a respective medial end 26, 28 and a respective distal end 30, 32 that are opposite the respective medial ends. When assembled, the medial end 26 of the first piece 22 either engages or abuts the medial end 28 of the second piece 24.

The instant invention contemplates numerous engagement mechanisms for engaging the medial ends 26, 28 of the first and second pieces 22, 24. For example, the engagement mechanisms may include a friction-fit engagement, a snap-fit engagement, threaded engagement, abutment, adhesion, or any other engagement mechanism that promotes engagement of the first and second pieces 22, 24. In one embodiment, the medial end 26 of the first piece 22 may include a female portion 33 configured to matingly receive a generally hollow male extension 34 configured at the medial end 28 of the second piece 24. Because the second piece 24 is preferably composed of a relatively more elastic material than that of the first piece 22, an outer diameter of the male extension 34 may be slightly larger than an inner diameter of the female portion to provide a snug and secure frictional engagement. Additionally, the first and second pieces 22, 24 of the assembled nonconductive core plug 16 need not engage one another at all, but may simply have the respective medial ends 26, 28 in abutment with one another. The respective medial ends 26, 28 of the first and second pieces 22, 24 may not even contact one another, but align in close enough proximity to one another to permit assembly of the multiple pitch helical radiator 12 onto the first and second pieces.

For example, in the preferred embodiment of the invention, the medial ends 26, 28 engage in a friction-fit engagement to removably secure the first and second pieces 22, 24 to one another. Preferably, the medial end 26 of the first piece 22 is configured to have an external circumference that is generally coextensive with the predetermined external circumference of the second piece 24. The external circumferences of the two pieces 22, 24 need not be generally coextensive, but the recessed patterns 18, 20 disposed thereon are preferably configured so that when the helical radiator is assembled to the two pieces, a minor diameter of the helical radiator 12 is generally uniform throughout. The hollow first piece 22 also has a predetermined inner circumference that defines the female portion 33 that extends therethrough. The inner circumference is preferably defined by a circumferential flange 36 on an inner surface of the first piece 22. At its bottom surface, the medial end 26 of the first piece 22 includes a generally planar circular surface 38.

Like the first piece 22, the second piece 24 is preferably a generally hollow cylindrical structure having a central orifice 40, so that when the first and second pieces are coupled, the resulting nonconductive core plug 12 is also generally hollow and cylindrical with a generally cylindrical passageway 41 extending therethrough. However, unlike the first piece 22, the medial end 28 of the second piece 24 preferably includes the male extension 34 configured to matingly engage the female portion 33 of the medial end 26 of the first piece.

The male extension 34 is a generally cylindrical extension having an external circumference that is preferably either equal to or slightly larger than the female portion 33 of the first piece 22. The male extension 34 extends in a direction parallel to the longitudinal axis of the second piece 24 at a predetermined distance from a generally planar shelf portion 42 disposed at the medial end 28 of the second piece. Typically but not necessarily, the male extension 34 extends for a distance commensurate with the longitudinal height of the circumferential flange 36 disposed on the inner surface of the first piece 22. In an alternative embodiment, the male extension 34 is configured to be slightly smaller in a longitudinal direction than the circumferential flange 36 to promote mating engagement throughout a tolerance range. At a top portion of the male extension 34 includes a graduated surface 44 having a gradually narrowing circumference. Also included on the top portion of the male extension 34 is a top planar portion 46.

Thus, to matingly engage the first and second pieces 22, 24, the male extension 34 is inserted into the female portion 33 defined by the inner predetermined circumference of the first piece 22. Because the circumference of the male extension 34 is configured to be either equal to or slightly larger than the inner circumference defining the female portion 33, the male extension inserts into the female portion and frictionally engages the female portion at the circumferential flange 36 of the first piece 22. In this manner, the first and second pieces 22, 24 frictionally engage one another. The female portion 33 and the orifice 40 are aligned in the assembled core plug 16 to form the passageway through the core plug.

Prior to assembling of the first and second pieces 22, 24 to one another, one of the first and second pieces is assembled into the multiple pitch helical radiator 12. Subsequently, the remaining first or second piece 22, 24 is assembled into the helical radiator 12 and assembled to the other first or second piece 22, 24 that was previously assembled into the helical radiator. In the preferred embodiment, assembly of the instant invention first includes coupling the multiple pitch helical coil 12 to the first piece 22 of the nonconductive core plug 16 prior to coupling the first piece and second piece 24 to one another. However, the order in which each of the plurality of pieces is coupled to the multiple pitch helical radiator 12 may be altered without materially affecting the properties of the invention.

Figure 10:
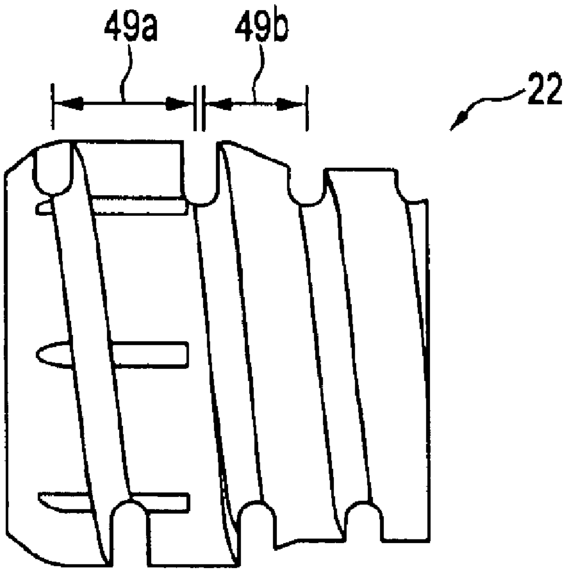
FIG. 10 is a side elevational view of an alternative embodiment of the first piece of the nonconductive core plug of the instant invention.
Figure 11:
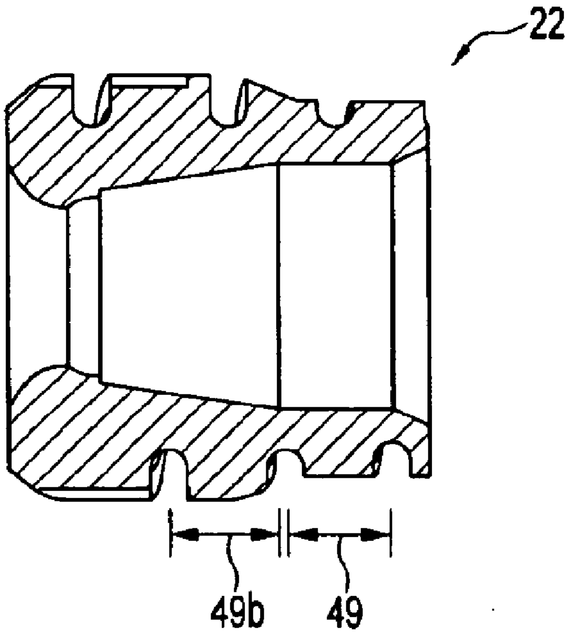
FIG. 11 is a cross sectional view of an alternative embodiment of the first piece of the nonconductive core plug of the instant invention.
Figure 12:
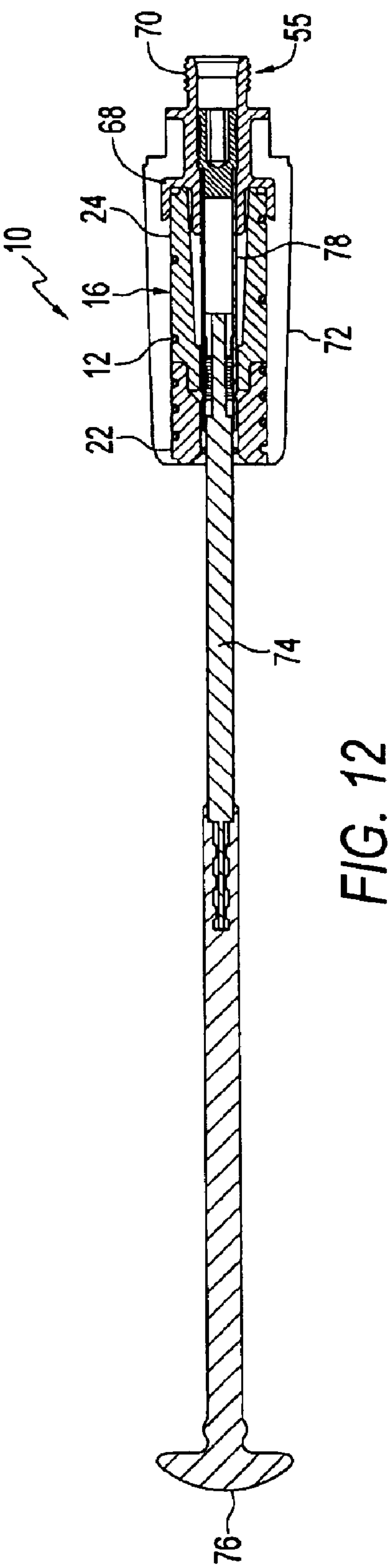
FIG. 12 a cross sectional view of the core plug of the instant invention assembled into an antenna in an extended position.
Figure 13:
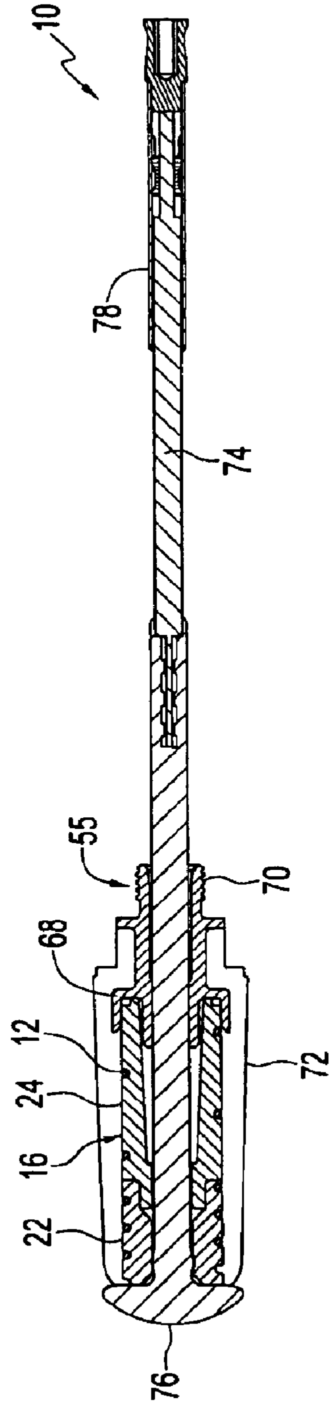
FIG. 13 a cross sectional view of the core plug of the instant invention assembled into an antenna in a retracted position.

The first piece 22 includes the first recessed pattern 18 on an external surface thereof that is configured to engage a first portion 48 of the multiple pitch helical radiator 12. Additionally, the first recessed pattern 18 may include two or more helical pitches that are similar enough to one another so that the first piece 22 may engage the first portion 48 of the helical radiator 12 to create two pitches within the first portion. For example, as illustrated in FIGS. 10 and 11, the first piece 22 includes a top helical pitch pattern **49*a* and a bottom helical pitch 49*b* having predetermined pitch distances. By way of example, the embodiment illustrated in FIGS. 10 and 11 includes a first pitch distance of 1.79 mm and 2.43 mm, respectively. Similarly, the second piece 24 includes the second recessed pattern 20 on an external surface thereof that is configured to engage a second portion 50 of the multiple pitch helical radiator 12. Like the first piece 22, the second recessed pattern 20** may include two or more helical pitches that are relatively similar to one another.

Typically, the minor diameter of the helical radiator 12 is slightly smaller than an outer minor diameter of the first and second pieces 22, 24 so that when wound onto the first and second pieces, the helical radiator nests snugly within the recessed patterns 18, 20. The longitudinal length of both the first and second pieces 22, 24 of the nonconductive core plug 16 correspond generally to the physical length of the first and second portions 48, 50 of the helical radiator 12, respectively. With respect to one another, the first and second pieces 22, 24 may be similar or disparate in their physical lengths, since their physical lengths are only determined by the length of the first and second portions 48, 50.

The first recessed pattern 18 has a first terminus 52 that commences at the medial end 26 of the first piece and a second terminus 54 toward the distal end 30 of the first piece. Between the first and second termini 52, 54 is the first recessed pattern 18, which is configured to engage the first portion 48 of the multiple pitch helical radiator 12. Alternatively, the first recessed pattern 18 may include two or more helical pitches configured to engage the first portion 48 of the multiple pitch helical radiator 12. The depth of the first recessed pattern 18 with respect to the external surface of the first piece 22 is sized to accommodate the multiple pitch helical radiator 12.

In the preferred embodiment, while the second terminus 54 has an end wall 56 for retaining a leading end 58 of the multiple pitch helical radiator 12, the first terminus 52 preferably lacks an end wall so that the leading end may slidingly engage the first recessed pattern 18 at the first terminus, and be assembled around the pitch of the first recessed pattern until the leading end abuts the rear wall at the second terminus. The end wall 56 is preferably provide uniformity during manufacture, so that when the helical coil 12 is assembled to the first piece 22, the leading end 58 may consistently be placed and maintained in a predetermined position, thus reducing or eliminating variance in electrical properties. In this manner, the first portion 48 of the multiple pitch helical radiator 12 is assembled onto the first piece 22 to matingly engage same. The instant antenna assembly 10 contemplates that the first terminus 52 may optionally include an end wall without altering the invention.

Once the first portion 48 of the multiple pitch helical radiator 12 is coupled to the nonconductive core plug 16, the second piece 24 of the nonconductive core plug 16 is assembled into the second portion 50. To this end, the second piece 24 includes the second recessed pattern 20, which, like the first recessed pattern 18, includes a first terminus 60 and a second terminus 62. The first terminus 60 is disposed at the medial end 28 of the second piece 24, and the second terminus 62 is disposed at the distal end 32 of the second piece. Unlike the first recessed pattern 18, preferably neither the first or the second termini 60, 62 include an end wall. When the core plug 16 is assembled, the first terminus 52 at the medial end 26 of the first piece 22 aligns with the first terminus 60 at the medial end 28 of the second piece 24, and the boundary between the two termini is continuous since both lack an end wall. Thus, a lagging end 64 of the multiple pitch helical radiator 12 is inserted into the channel defined by the second recessed pattern 20 at the first terminus 60 of the second piece 24. The second piece 24 is then assembled onto the second portion 20 of the helical radiator 12.

Since the first recessed pattern 18 is configured to correspond to the vertical length of the first portion 48 of the multiple pitch helical radiator 12, and the second recessed pattern 20 is configured to correspond to the vertical length of the second portion 50 of the multiple pitch helical radiator, the medial ends 28, 30 of the first and second pieces 22, 24 will encounter and engage one another once the first and second pieces are fully assembled into the multiple pitch helical radiator. Thus, as the second piece 24 is assembled into a portion of the multiple pitch helical radiator 12 corresponding to the second portion 50 of the multiple pitch helical radiator, it encounters the medial end 28 of the first piece 22. Fully assembling the second piece 24 onto the second portion 50 assembles the male extension 34 into the female portion 33 of the first piece 22, frictionally engaging the first piece. In this manner, the second piece 24 of the nonconductive core plug 16 is coupled to both the multiple pitch helical radiator 12 and to the first piece 22 of the nonconductive core plug, which is already coupled to the multiple pitch helical radiator. Therefore, in the preferred embodiment, frictional engagement of the female portion 33 with the male extension 34 completes coupling of the nonconductive core plug 16 to the multiple pitch helical radiator 12.

Once the first and second pieces 22, 24 of the core plug 16 are assembled within the helical radiator 12, the conductive mounting ferrule 55 is mounted to a bottom end of the second piece. The conductive mounting ferrule 55 preferably electrically connects the assembled antenna assembly 10 to the portable communication device via threaded engagement. To this end, the conductive mounting ferrule 55 is composed of a metal such as ARCAP and APID and includes an upper end 68 configured to matingly receive the second piece, thereby overlapping and contacting at least a portion of the multiple pitch helical radiator 12. The multiple pitch helical radiator 12 and the conductive mounting ferrule 55 are maintained in engagement via crimping or other means. The conductive mounting ferrule 55 also contains a bottom portion 70 that threadedly engages the portable communication device. Thus, because the conductive mounting ferrule 55 is connected both to the helical radiator 12 and the portable communication device, the helical radiator is electrically coupled to the portable communication device.

Once the conductive mounting ferrule 55 is coupled to the helical radiator 12 and the assembled core plug 16, an overmold 72 is assembled over the helical radiator and core plug, preferably by a process known in the art as overmolding, wherein the conductive mounting ferrule 55 and helical radiator 12 are placed in a plastic injection molding tool. The plastic is injected in the tool and surrounds the conductive mounting ferrule 55 and helical radiator 12, and then cools and hardens. The overmold 72 is preferably made of a plastic, such as Lexan 141. After the overmold 72 is deposited, a whip radiator 74 is formed, for example a NiTi wire coated with a plastic such as polyurethane. An end cap 76 is assembled to an upper end thereof to prevent slippage of the whip radiator 74 through the longitudinal cavity 47 of the core plug 16. Assembly of the end cap 76 to the whip radiator 74 is also preferably accomplished using overmolding. Using a TPU for the first piece 22, such as Texin 255, has the additional advantage of providing an elastic detent for securely receiving the end cap 76 within the central orifice 40 when the antenna assembly 10 is in a retracted position.

Preferably the NiTi wire of the whip radiator 74 only extends along a portion of the whip radiator, from a bottom portion of the whip radiator to a predetermined point of the whip radiator preceding the conductive mounting ferrule 55 when the antenna assembly 10 is in the retracted position within the phone. This prevents the whip radiator 74 from disturbing the electrical properties of the helical radiator 12 when the antenna assembly 10 is retracted within the portable communication device. Typically a conductive sleeve 78 having an electrical contact (not shown) disposed therein is assembled to the bottom portion of the whip radiator 74 so that the antenna assembly 10 maintains electrical contact with the portable communication device when the antenna assembly is in an extended position.

The instant invention contemplates that the core plug 16 may be configured to correspond to pitch distances of unlimited numbers. However, for purposes of illustration, some exemplary pitch distances follow. For example, in a dual bandwidth embodiment wherein each of the pieces 22, 24 of the core plug 16 include respective first and second recessed patterns 48, 50 having only a single pitch pattern, one pitch pattern might be consistent with GSM bandwidth (880–960 MHz) and one might be consistent with DCS bandwidth (1710–1880 MHz).

An example of a triband antenna assembly wherein of the pieces 22, 24 includes two pitch patterns, one piece might include a pitch pattern consistent with CDMA800 (824–894 MHz), while the other piece includes one pitch pattern consistent with GPS (1575 MHz) and one pitch pattern consistent with CDMA1900 (1850–1990 MHz). For example, the GPS and CDMA 1850–1990 pitch patterns may be disposed on the second piece 24 and the CDMA 800 pitch pattern may be disposed on the first piece 22. Similarly, one pitch pattern might be consistent with iDEN (806–941 MHz) and one pitch pattern might be consistent with GPS bandwidth (1575 MHz).

Where each of the two pieces 22, 24 of the core plug 16 include two pitch patterns, a quadband antenna assembly is achieved. One piece of the core plug 16 might include pitch patterns consistent with AMPS (824–894 MHz) and GSM (880–960 MHz), while the other piece includes pitch patterns consistent with DCS (1710–1880 MHz) and PCS (1850–1990 MHz).

While a particular embodiment of the present antenna assembly has been described herein, it will be appreciated by those skilled in the art that changes and modifications may be made thereto without departing from the invention in its broader aspects and as set forth in the following claims.

What is claimed is:

1. A multiple bandwidth antenna assembly comprising:

a helical radiator having at least a first helical pitch and a second helical pitch;

a core plug having a first axial piece and a second axial piece that abut one another; and a first recessed pattern configured on said first axial piece to engage at least said first helical pitch and a second recessed pattern configured on said second axial piece to engage at least said second helical pitch.

2. The multiple bandwidth antenna assembly of claim 1 wherein said first axial piece and said second axial piece are configured to couple with one another.

3. The multiple bandwidth antenna assembly of claim 1 wherein said first axial piece and said second axial piece threadedly engage one another.

4. The multiple bandwidth antenna assembly of claim 1 wherein said first axial piece and said second axial piece engage one another in a snap-fit engagement.

5. The multiple bandwidth antenna assembly of claim 1 wherein medial ends of each of said first and second axial pieces are configured to matingly engage one another.

6. The multiple bandwidth antenna assembly of claim 1 wherein medial ends of each of said first and second axial pieces are configured to frictionally engage one another.

7. The multiple bandwidth antenna assembly of claim 1 wherein medial ends of each of said first and said second axial pieces are configured to be in abutment with one another.

8. The multiple bandwidth antenna assembly of claim 1 wherein medial ends of each of said first axial piece and said second axial piece are held in engagement by adhesion.

9. The multiple bandwidth antenna assembly of claim 1 wherein said first helical pitch creates resonance at a frequency of 1575 MHz and a combination of said first helical pitch and said second helical pitch creates resonance between 806 and 941 MHz.

10. The multiple bandwidth antenna assembly of claim 1 wherein said second axial piece is made of a relatively more elastic material than said first axial piece.

11. The multiple bandwidth antenna assembly of claim 10 wherein said second axial piece comprises Lexan 141 and said first axial piece comprises Texin 255.

12. The multiple bandwidth antenna assembly of claim 1 wherein one of said first and second recessed patterns includes a second helical pitch.

13. The multiple bandwidth antenna assembly of claim 12 wherein said second recessed pattern is configured to engage both of said first and said second helical pitches.

14. The multiple bandwidth antenna assembly of claim 1 wherein said first and second recessed patterns each include a second helical pitch.

15. The multiple bandwidth antenna assembly of claim 14 wherein said helical radiator is configured to engage said first and second helical pitches and each of said first and second recessed patterns.

16. A multiple bandwidth antenna assembly comprising:

core means having at least two abutting pieces;

coupling means having a predetermined helical pitch for removably coupling said at least two pieces to one another;

engagement means disposed on said at least two pieces and configured to matingly engage said coupling means.

17. The multiple bandwidth antenna assembly of claim 16 wherein said coupling means comprises a multiple pitch helical radiator.

18. The multiple bandwidth antenna assembly of claim 16 wherein said engagement means comprises at least two recessed patterns.

19. The multiple bandwidth antenna assembly of claim 18 wherein said at least two recessed patterns each include at least one helical pitch.

20. The multiple bandwidth antenna assembly of claim 18 wherein one of said at least two recessed patterns includes a first and a second helical pitch.

21. The multiple bandwidth antenna assembly of claim 19 wherein one of said at least two recessed patterns includes a helical pitch of 1.79 mm, and a second of said at least two recessed patterns includes a helical pitch of 5.40mm.

22. The multiple bandwidth antenna assembly of claim 20 wherein one of said at least two recessed patterns includes a first helical pitch of 1.79 mm and a second helical pitch of 2.43 mm, and a second of said at least two recessed patterns includes a helical pitch of 5.40 mm.

23. The multiple bandwidth antenna assembly of claim 16 wherein said core means comprises a plurality of pieces.

24. A multiple bandwidth antenna assembly comprising:

core means having at least two abutting pieces;

a helical radiator having at least one predetermined helical pitch for removably coupling said at least two pieces to one another;

engagement means disposed on said at least two pieces and configured to matingly engage said helical radiator.

* * * * *